F. W. LOTZ.
PROCESS FOR PREPARING FOODS.
APPLICATION FILED MAR. 20, 1915.

1,157,016.

Patented Oct. 19, 1915.

Inventor
FREDERICK W. LOTZ
By Watson E. Coleman
Attorney

UNITED STATES PATENT OFFICE.

FREDERICK W. LOTZ, OF PHILADELPHIA, PENNSYLVANIA.

PROCESS FOR PREPARING FOODS.

1,157,016. Specification of Letters Patent. Patented Oct. 19, 1915.

Application filed March 20, 1915. Serial No. 15,907.

*To all whom it may concern:*

Be it known that I, FREDERICK W. LOTZ, a citizen of the United States, residing at Philadelphia, in the county of Philadelphia and State of Pennsylvania, have invented certain new and useful Improvements in Processes for Preparing Foods, of which the following is a specification, reference being had to the accompanying drawings.

This invention relates to an improved process for preparing foods and more particularly to a process for preparing boneless cooked hams in such marketable form that the same may be sold by the retailer with a minimum of loss, due to waste.

More specifically stated, the present invention may be said to be characterized by the improved method or process of removing the leg and blade bones from the ham so that the same may subsequently be compressed in a mold which also serves as a heat conducting jacket in which the ham is cooked.

It is a further object of my invention to produce a process of the above character whereby the shank of the ham, which is ordinarily wasted by the retailer or cannot be profitably sold, is eliminated, the meat on the shank being disposed in the cavities resulting from the removal of the bones, and the whole subsequently molded into suitable shape and cooked.

Figure 1:
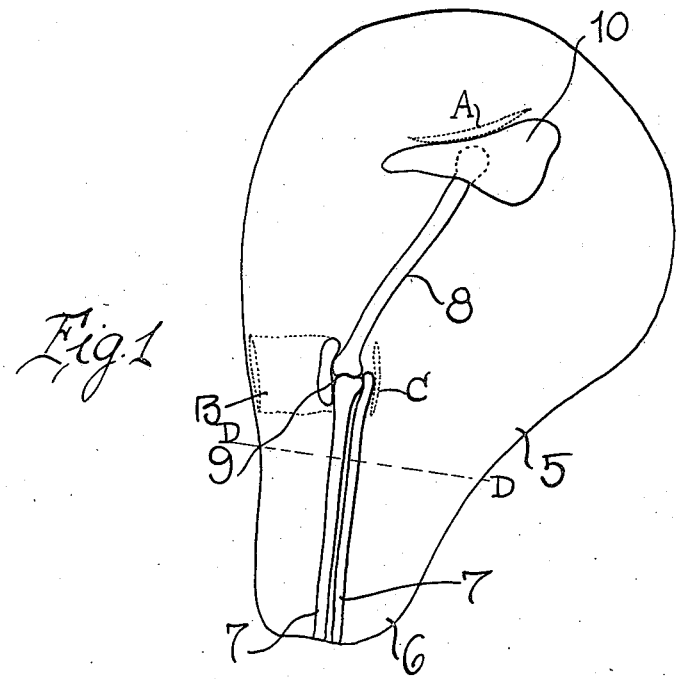
Figure 2:
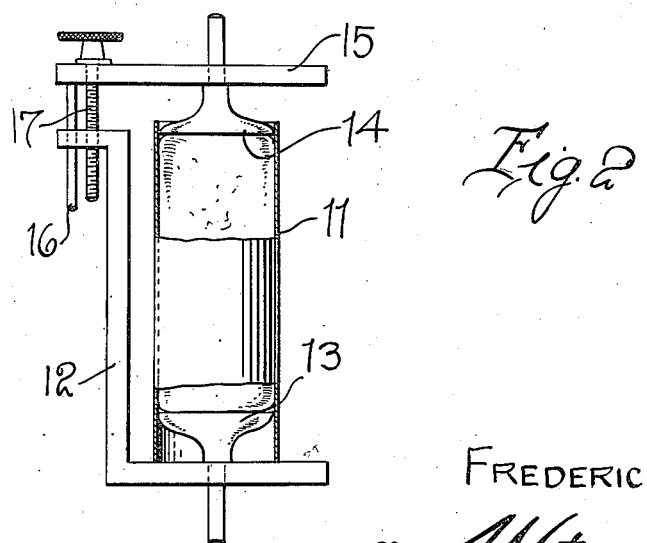

In the accompanying drawing, wherein I have illustrated the preferred manner of carrying out the present invention, Figure 1 illustrates in diagram, a ham and the bones therein; and Fig. 2 is an elevation of the compressing cylinder or mold and the relatively adjustable disks which are disposed within the ends thereof.

Referring in detail to the drawing, and more particularly to Fig. 1 thereof, 5 designates the ham and 6 the shank portion thereof. The leg bones, indicated at 7, are connected to the thigh bone 8 by the knee joint 9, and the end of the thigh bone is connected to the blade 10. In practice, choice smoked hams are used, and the skin and fat are first removed from the exterior thereof. The blade bone 10 is then carefully removed by cutting the same loose from the adhering muscles and disconnecting the joint, by which it is attached to the thigh bone 8. An incision is then made at A and the muscles carefully loosened by means of a knife or other instrument from the thigh bone 8. A second incision is now made at B so as to expose the knee cap and joint, the cap being removed and the joint loosened. The bone 8 is removed through the incision A and a third incision C is then made and the muscles attached to the leg bones 7 are carefully loosened and these bones removed. The shank portion 6 of the ham is then cut off along the line indicated at D—D. The several incisions are then carefully sewed up.

Having first prepared the ham by the removal of the bones therefrom, in the manner above described, the same is now placed in a cylinder or mold 11, said mold being of any suitable construction whereby the ham may be compressed. In one end of a suitable frame 12, a disk 13 is removably mounted, and a similar disk 14 is removably mounted in the adjustable bar 15 which is provided with a pin 16 in one of its ends which extends through a guide opening in the other end of the frame 12. The bar 15 carries an adjusting screw 17 which has threaded engagement in the latter end of the frame 12. After the ham has been placed within the cylinder 11, said cylinder is disposed between the disks 13 and 14 and the screw 17 adjusted, whereby the disks are engaged in the opposite ends of the cylinder and against the ends of the ham so that a longitudinal pressure is exerted upon the same. The ham thus compressed within the cylinder is placed in a tank of boiling water and thoroughly cooked. After the lapse of the necessary time, the ham is removed from the tank and then chilled, after which the molded ham is removed from the cylinder and is ready for consumption.

Boneless boiled ham has heretofore been placed on the market with a small strip of the exterior skin remaining to hold the strips of meat and the intervening fat on the shank together. This shank end of the ham results in a waste to the retailer of about two pounds. By preparing the ham in the manner above described, after the shank portion 6 is cut off, the strips of meat are removed therefrom and the same inserted into the cavities in the body of the ham, prior to sewing up the incisions. Thus, there are no spaces or cavities in the interior of the ham; but the same will be perfectly solid throughout its volume and thus compressed into cylindrical form in the mold. It will, therefore, be appreciated that not only is waste of the meat eliminated, but the ham will retain its cylindrical shape, in which form it is commercially sold.

From the foregoing description taken in connection with the accompanying drawing, it is believed that my improved method of preparing boneless cooked hams will be clearly and fully understood.

The entire ham, as it is purchased by the retailer or consumer, may be consumed without any waste whatsoever.

The invention, while of very simple character, results in a food product of marked value, and of obvious superiority from a commercial standpoint.

While I have specifically described the preferred mode of carrying out my invention, it is to be understood, of course, that the order of removing the several bones above specified, need not be adhered to, as the primary consideration resides in the elimination of the shank portion of the ham in the marketable product, without waste owing to the removal of the meat from such shank portion and its embodiment in the molded ham.

Having thus fully described my invention, what I desire to claim and secure by Letters Patent is:—

1. The herein described method of preparing hams which consists in removing the blade and leg bones from the body of the ham, then cutting off the shank and removing the meat therefrom and placing the same within the cavities resulting from the removal of said bones, and finally compressing the ham into a molded form and cooking the same while in the mold.

2. The herein described method of preparing hams which consists in first removing the skin and fat from the exterior of the ham, then making incisions in the body of the ham and removing the blade and leg bones therefrom, then cutting off the shank of the ham and removing the meat from said shank and placing the same within the cavities resulting from the removal of the bones, then closing the incisions, and finally placing the ham into a suitable mold and compressing the same both longitudinally and transversely and cooking the ham while in said mold.

In testimony whereof I hereunto affix my signature in the presence of two witnesses.

FREDERICK W. LOTZ.

Witnesses:
G. A. SWAYZE,
HENRY K. FRIES.